US011139652B2

(12) United States Patent
Cutcher et al.

(10) Patent No.: US 11,139,652 B2
(45) Date of Patent: Oct. 5, 2021

(54) SYSTEM AND METHOD FOR A LOAD-BASED SELECTABLE BATTERY CELL

(71) Applicant: MOTOROLA SOLUTIONS, INC., Chicago, IL (US)

(72) Inventors: Jeffrey L. Cutcher, Davie, FL (US); Rajesh Baliram Singh, Davie, FL (US); Daniel L. Cronin, Hollywood, FL (US); Rolando Hernandez, Miami, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 87 days.

(21) Appl. No.: 15/991,887

(22) Filed: May 29, 2018

(65) Prior Publication Data

US 2019/0372363 A1 Dec. 5, 2019

(51) Int. Cl.
*H02J 1/08* (2006.01)
*H01M 10/44* (2006.01)
(Continued)

(52) U.S. Cl.
CPC .............. *H02J 1/084* (2020.01); *H01M 10/44* (2013.01); *H01M 16/00* (2013.01); *H02J 1/082* (2020.01);
(Continued)

(58) Field of Classification Search
CPC ...... H02J 7/0026; H02J 7/0063; H02J 7/0065; H02J 7/0024; H02J 2007/0067;
(Continued)

(56) References Cited

U.S. PATENT DOCUMENTS 5,587,250 A 12/1996 Thomas et al.
5,738,919 A 4/1998 Thomas et al.
(Continued)

FOREIGN PATENT DOCUMENTS

EP 3211751 A1 8/2017

OTHER PUBLICATIONS

International Search Report & Written Opinion dated Jul. 18, 2019 for corresponding International Application No. PCT/US2019/032523 (15 pages).
(Continued)

*Primary Examiner* — Richard Isla
*Assistant Examiner* — Manuel Hernandez
(74) *Attorney, Agent, or Firm* — Michael Best & Friedrich LLP

(57) ABSTRACT

Power supply and method for supplying power. One example power supply includes a first power source, a second power source, and a control circuit. The first power source provides electrical current to a first power output terminal. The first power source also provides electrical current to a second power output terminal. The second power source has a voltage level that is lower than the first power source. The control circuit is configured to measure a load current supplied to the second power output terminal. The control circuit is also configured to compare the measured load current to a threshold. Responsive to detecting the measured load current being higher than the threshold, the control circuit is configured to connect the second power source to the second power output terminal to provide electrical current thereto.

15 Claims, 8 Drawing Sheets

(51) Int. Cl.
  *H02J 7/00* (2006.01)
  *H02J 7/34* (2006.01)
  *H01M 16/00* (2006.01)
  *H01M 10/42* (2006.01)
  *H02J 1/10* (2006.01)

(52) U.S. Cl.
  CPC .......... *H02J 7/0024* (2013.01); *H02J 7/0026* (2013.01); *H02J 7/0063* (2013.01); *H02J 7/34* (2013.01); *H02J 7/342* (2020.01); *H01M 10/4264* (2013.01); *H02J 1/108* (2013.01); *H02J 7/345* (2013.01); *H02J 2007/0067* (2013.01)

(58) Field of Classification Search
  CPC .. H02J 1/084; H02J 1/082; H02J 1/108; H02J 7/34; H02J 7/342; H02J 7/345; H04W 24/04; H01M 10/4264; H01M 10/44; H01M 16/00
  USPC .................................. 320/126, 127, 135, 136
  See application file for complete search history.

(56) References Cited

U.S. PATENT DOCUMENTS

| | | | |
|---|---|---|---|
| 7,000,124 B2 * | 2/2006 | Chen | G06F 1/266 713/300 |
| 7,977,915 B2 | 7/2011 | Gilmore et al. | |
| 8,547,065 B2 | 10/2013 | Trigiani | |
| 8,994,331 B2 | 3/2015 | Kerfoot, Jr. et al. | |
| 9,213,385 B2 | 12/2015 | Berke et al. | |
| 9,214,710 B1 | 12/2015 | Cowen | |
| 10,199,833 B1 * | 2/2019 | Bucher | H02J 4/00 |
| 2007/0188137 A1 * | 8/2007 | Scheucher | B60L 50/64 320/116 |
| 2010/0087961 A1 * | 4/2010 | Velez | H02J 7/0063 700/292 |
| 2010/0114235 A1 * | 5/2010 | Jiang | A61N 1/378 607/34 |
| 2010/0257529 A1 * | 10/2010 | Wilkerson | H02J 7/345 718/102 |
| 2011/0062785 A1 | 3/2011 | Odland et al. | |
| 2012/0150247 A1 * | 6/2012 | Meier | H01M 10/425 607/5 |
| 2012/0262073 A1 | 10/2012 | Sumisaki et al. | |
| 2013/0043929 A1 * | 2/2013 | Chen | G06F 1/263 327/535 |
| 2013/0339757 A1 * | 12/2013 | Reddy | G06F 1/3212 713/300 |
| 2014/0108846 A1 * | 4/2014 | Berke | G06F 1/263 713/340 |
| 2014/0167703 A1 * | 6/2014 | Tzivanopoulos | H04L 12/40006 320/136 |
| 2015/0121092 A1 * | 4/2015 | Hung | H02J 50/001 713/300 |
| 2017/0244268 A1 * | 8/2017 | Villar Pique | H02J 7/0052 |
| 2018/0143263 A1 * | 5/2018 | Humphrey | G01R 31/40 |
| 2019/0115628 A1 * | 4/2019 | Ho | H01M 10/44 |
| 2019/0173274 A1 * | 6/2019 | Fukae | H01M 10/48 |

OTHER PUBLICATIONS

Australian Patent Office Examination Report for Application No. 2019276807 dated Jun. 4, 2021 (3 pages).

* cited by examiner

SYSTEM AND METHOD FOR A LOAD-BASED SELECTABLE BATTERY CELL

BACKGROUND OF THE INVENTION

Many communication devices include battery safety circuits that immediately turn off the devices when peak current usage exceeds a threshold. For example, in a converged communication device the combined usage of a land mobile radio circuit for transmission and an operating system for boot-up can cause the peak current to exceed the rated limits of the battery pack.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
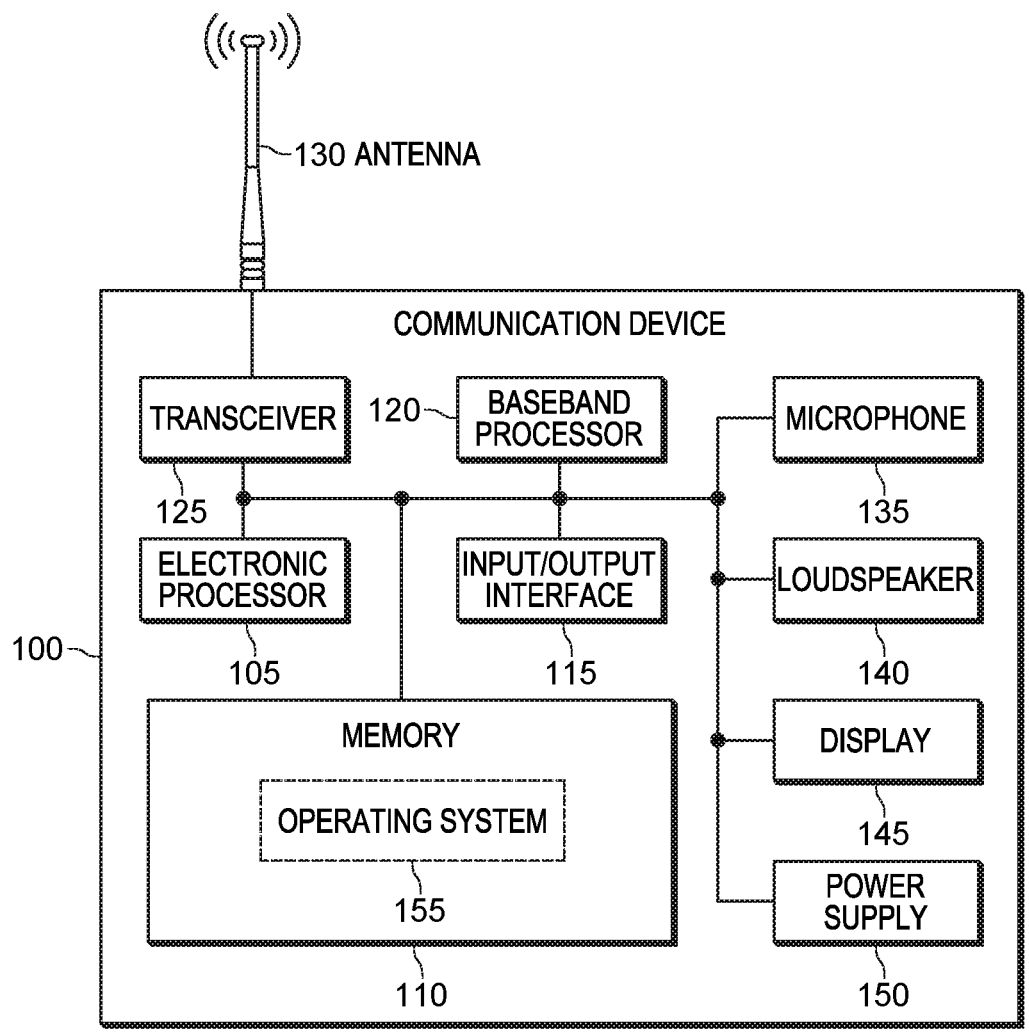
FIG. 1 is a diagram of a communication device, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A battery pack in a communication device can become damaged when the peak current usage of the communication device exceeds the rated limits of the battery pack for an extended period of time. As noted, many communication devices include a battery safety circuit that immediately turns off the communication device when peak current usage exceeds a threshold. It is desirable to manage peak current usage in a communication device without disrupting the operation of the communication device.

One approach to better manage peak current usage in a communication device is to improve load efficiencies. For example, more power efficient components may be used to reduce the overall peak current usage. However, simply reducing the overall peak current usage may still result in peak current usage that exceeds the rated limits of the battery pack. In addition, more power efficient components may cost more, and have less operability, than less power efficient components. Further, the duration of a peak current event in a communication device is often brief (for example, about 10 seconds). Thus, instead of attempting to avoid peak current events in a communication device, it is desirable to manage peak current usage such that the communication device can continue to function without causing damage to the battery.

Among other things, embodiments presented herein manage peak current usage in a communication device by adding a secondary power source that supplies electrical current only when peak current usage exceeds the rated limits of the primary power source. Using such embodiments, a communication device is able function during peak current events without damaging the batteries and without being turned off.

One example embodiment provides a power supply. The power supply includes a first power source, a second power source, and a control circuit. The first power source provides electrical current to a first power output terminal. The first power source also provides electrical current to a second power output terminal. The second power source has a voltage level that is lower than the first power source. The control circuit is configured to measure a load current supplied to the second power output terminal. The control circuit is also configured to compare the measured load current to a threshold. Responsive to detecting the measured load current being higher than the threshold, the control circuit is configured to connect the second power source to the second power output terminal to provide electrical current thereto.

Another example embodiment provides a method for supplying power. The method includes providing electrical current from a first power source to a first power output terminal and to a second power output terminal. The method also includes measuring, with a control circuit, a load current supplied to the second power output terminal. The method further includes comparing the measured load current to a threshold with the control circuit. The method also includes connecting, with the control circuit, a second power source to the second power output terminal to provide electrical current thereto responsive to detecting the measured load current being higher than the threshold. The second power source has a voltage level that is lower than the first power source.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a diagram of an example communication device 100. In the embodiment illustrated, the communication device 100 includes an electronic processor 105, a memory 110, an input/output interface 115, a baseband processor 120, a transceiver 125, an antenna 130, a microphone 135, a loudspeaker 140, a display 145, and a power supply 150.

The illustrated components, along with other various modules and components are coupled to each other by or through one or more electrical connections (for example, control or data buses) that enable communication therebetween. The use of such connections, including control and data buses, for the interconnection between and exchange of information among the various modules and components would be apparent to a person skilled in the art. In some embodiments, the communication device 100 includes fewer or additional components in configurations different from that illustrated in FIG. 1. For example, in some embodiments, the communication device 100 includes multiple microphones, multiple speakers, or combinations thereof.

The electronic processor 105 obtains and provides information (for example, from the memory 110 and/or the input/output interface 115), and processes the information by executing one or more software instructions or modules, capable of being stored, for example, in a random access memory ("RAM") area of the memory 110 or a read only memory ("ROM") of the memory 110 or another non-transitory computer readable medium (not shown). The software can include firmware, one or more applications, program data, filters, rules, one or more program modules, and other executable instructions. The electronic processor 105 is configured to retrieve from the memory 110 and execute, among other things, software related to the control processes and methods described herein. The memory 110 can include one or more non-transitory computer-readable media, and includes a program storage area and a data storage area. The program storage area and the data storage area can include combinations of different types of memory, as described herein. In the embodiment illustrated, the memory 110 stores, among other things, an operating system 155. In some embodiments, the operating system 155 is a version or derivative of the Android® mobile operating system (developed by Google, LLC).

The input/output interface 115 is configured to receive input and to provide system output. The input/output interface 115 obtains information and signals from, and provides information and signals to, (for example, over one or more wired and/or wireless connections) devices both internal and external to the communication device 100.

The electronic processor 105 is configured to control the baseband processor 120 and the transceiver 125 to transmit and receive voice and other data to and from other communication devices. The baseband processor 120 encodes and decodes digital data sent and received by the transceiver 125. The transceiver 125 transmits and receives radio signals to and from, for example, a network using the antenna 130. The electronic processor 105, the baseband processor 120, and the transceiver 125 may include various digital and analog components, which for brevity are not described herein and which may be implemented in hardware, software, or a combination of both. Some embodiments include separate transmitting and receiving components, for example, a transmitter and a receiver, instead of a combined transceiver 125.

The microphone 135 is a transducer capable of sensing sound, converting the sound to electrical signals, and transmitting the electrical signals to the electronic processor 105. The electronic processor 105 processes the electrical signals received from the microphone 135 to produce an audio stream, which may be transmitted to other devices via the transceiver 125. The loudspeaker 140 is a transducer for reproducing sound from electrical signals (for example, generated from a received audio stream) received from the electronic processor 105. The microphone 135 and the loudspeaker 140 support both ultrasonic and audible frequencies. In some embodiments, the microphone 135 and the loudspeaker 140 have single transducers that support both ultrasonic and audible frequencies. Alternatively, in some embodiments, the microphone 135 and the loudspeaker 140 have separate transducers for ultrasonic and audible frequencies. In some embodiments, the microphone 135, the loudspeaker 140, or both may be integrated in a single housing with the other components (for example, in a converged device). In some embodiments, the microphone 135, the loudspeaker 140, or both are present in an accessory device (for example, a remote speaker microphone (RSM)) connected via a wired or wireless connection to the communication device 100.

The display 145 is a suitable display, for example, a liquid crystal display (LCD) touch screen, or an organic light-emitting diode (OLED) touch screen. In some embodiments, the communication device 100 implements a graphical user interface (GUI) (for example, generated by the electronic processor 105, using the operating system 155 stored in the memory 110, and presented on the display 145), that enables a user to interact with the communication device 100.

Figure 2:
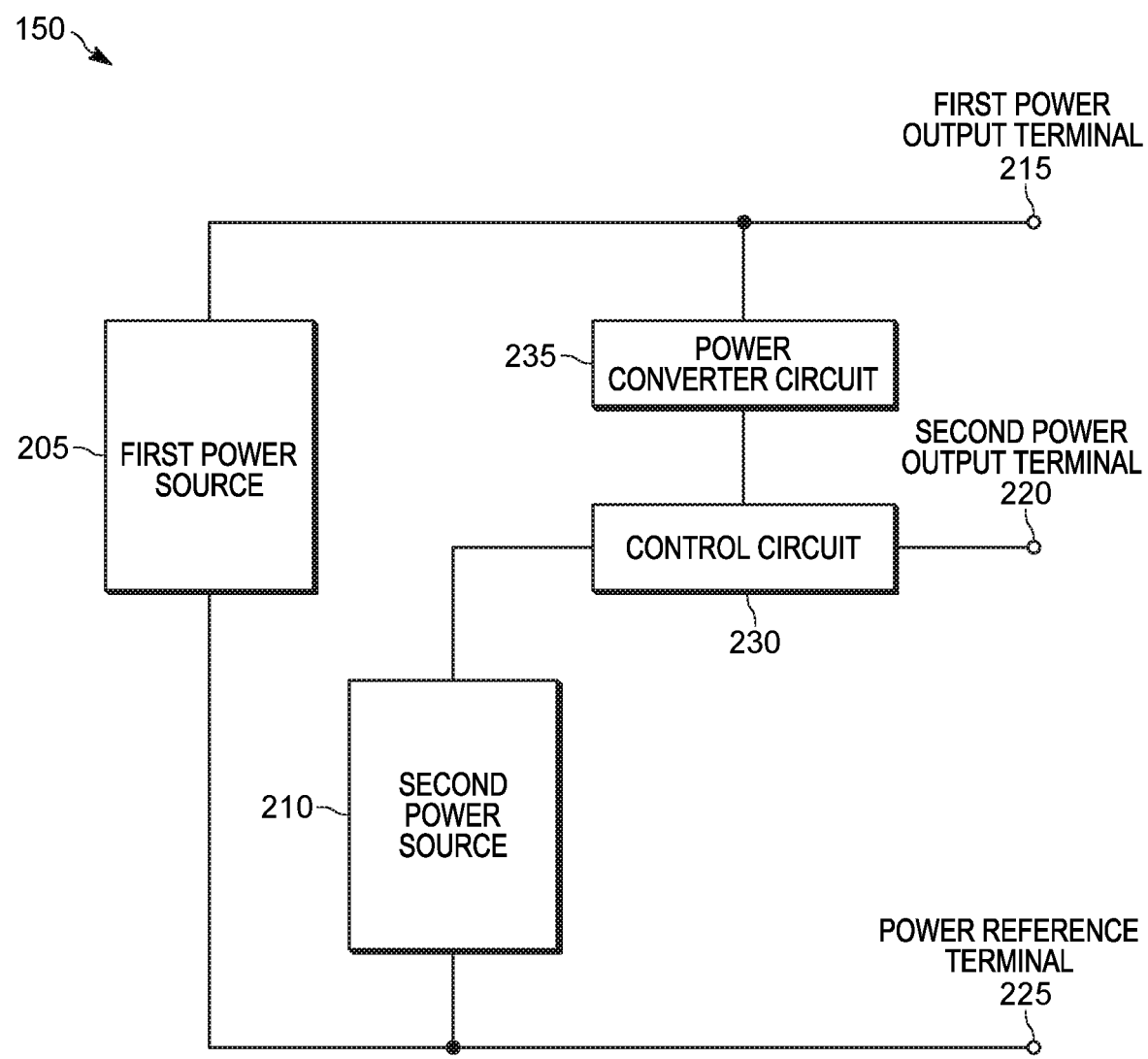
FIG. 2 is a diagram of a power supply included in the communication device of FIG. 1, in accordance with some embodiments.

The power supply 150 supplies power to the communication device 100. FIG. 2 schematically illustrates the power supply 150 in more detail. In the example provided, the power supply 150 includes a first power source 205, a second power source 210, a first power output terminal 215, a second power output terminal 220, a power reference terminal 225, a control circuit 230, and a power converter circuit 235.

The first power source 205 (for example, a primary power source) includes, for example, a battery cell, one or more batteries, a battery pack (including a plurality of battery cells connected in a series configuration, in a parallel configuration, or both), or a combination thereof. The second power source 210 (for example, an auxiliary power source) includes, for example, a battery cell, one or more batteries, a battery pack (including a plurality of battery cells connected in a series configuration, in a parallel configuration, or both), a super capacitor, or a combination thereof. The second power source 210 has a lower voltage level than the first power source 205. For example, the second power source 210 may supply a voltage level between 3 volts and 4.2 volts and the first power source 205 may supply a voltage level between 6 volts and 8.4 volts. As a further example, the second power source 210 may include a battery pack having one battery cell and the first power source 205 may include a battery pack having three battery cells. In some embodiments, the voltage level of the first power source 205 is at least twice the voltage level of the second power source 210.

The first power output terminal 215 and the second power output terminal 220 can be voltage rails for supplying two different voltages to components within the communication device 100. In some embodiments, the second power output terminal 220 has a rail voltage that is lower than the rail voltage of the first power output terminal 215. For example, the rail voltage of the second power output terminal 220 may be between 3 volts and 4.2 volts, and the rail voltage of the first power output terminal 215 may be between 6 volts and 8.4 volts. The power reference terminal 225 includes, for example, a system ground terminal.

The power converter circuit 235 converts the voltage supplied by the first power source 205 into a lower voltage for the second power output terminal 220. In some embodiments, the power converter circuit 235 includes a buck regulator.

In some situations, the peak current usage of the communication device 100 exceeds the rated limits of the first power source 205. For example, the peak current usage of the communication device 100 may exceed the rated limits of a first power source 205 when the electronic processor 105 is booting the operating system 155 while the transceiver 125 is transmitting signals via the antenna 130. Using the power supply techniques referenced herein, the control circuit 230 detects peak current usage events and supplies power from the second power source 210 such that peak current usage does not exceed the rated limits of the first power source 205.

In order to detect peak current usage, or the potential for peak current usage, the control circuit 230 is configured to measure the load current supplied to the second power output terminal 220 by the first power source 205. As described in more detail below, the control circuit 230 electrically couples the second power source 210 to the second power output terminal 220 to provide electrical current thereto when the measured load current is greater than a threshold.

Figure 3:
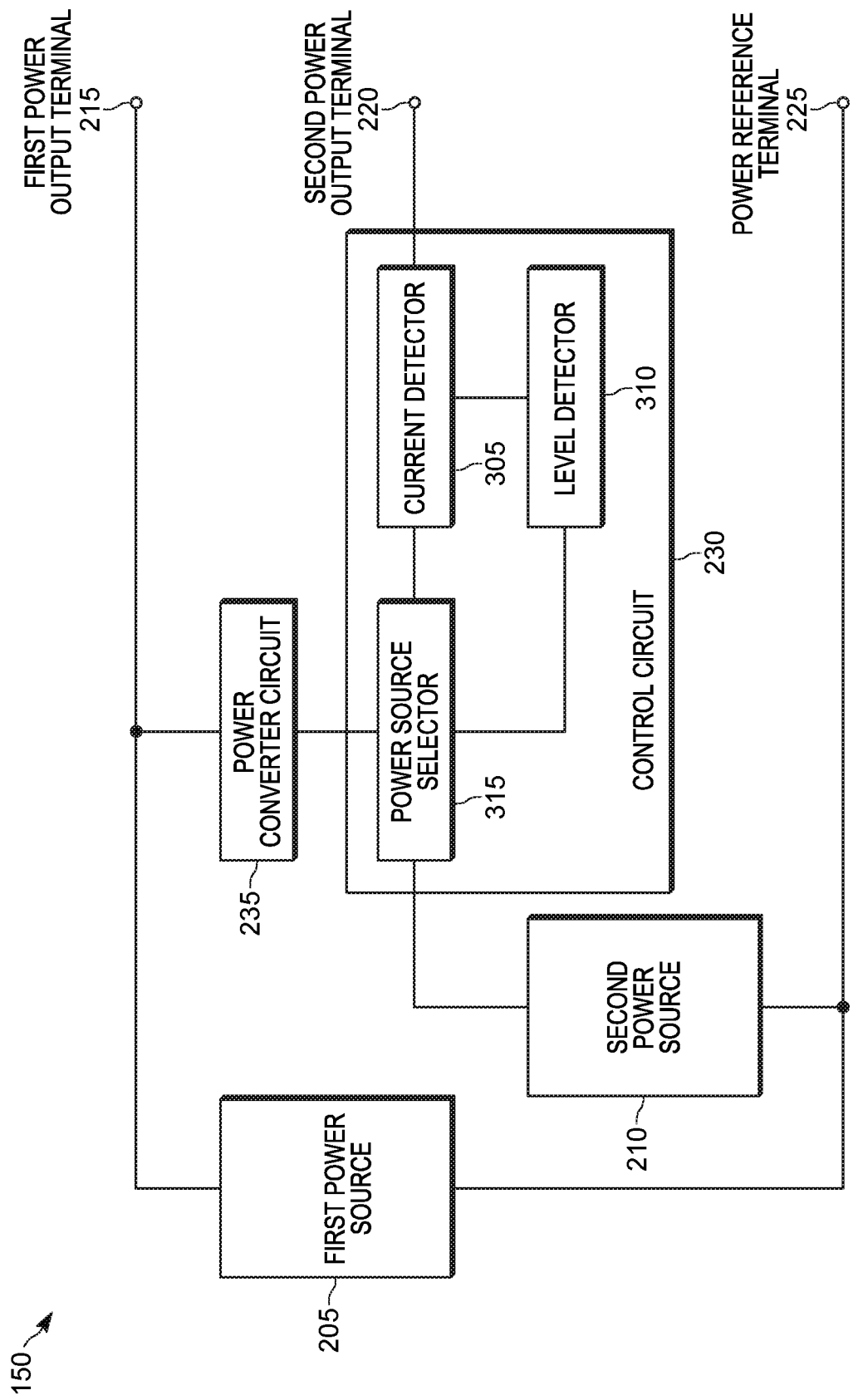
FIG. 3 is a diagram of a control circuit included in the power supply of FIG. 2, in accordance with some embodiments.

FIG. 3 is a diagram illustrating processing hardware and operation for the control circuit 230. The control circuit 230, as illustrated in FIG. 3, includes a current detector 305, a level detector 310, and a power source selector 315. For ease of description, FIG. 3 includes both functions (for example, the level detector 310), which may be implemented in hardware and software, and hardware components of the control circuit 230. In some embodiments, all (or a portion) of the functions of the control circuit 230 described herein are implemented by an electronic processor (similar to the electronic processor 105) (for example, using software stored in a memory), hardware, or a combination of both.

The current detector 305 is configured to measure the load current supplied to the second power output terminal 220. In some embodiments, the current detector 305 includes a current-sensing resistor and a two-input terminal differential amplifier. The resistor is connected in series between the power source selector 315 and the second power output terminal 220. A first input terminal of the amplifier is connected to a first electrode of the resistor. A second input terminal of the amplifier is connected to the second electrode of the resistor. The amplifier outputs a signal indicating the load current of the second output power terminal 220.

The level detector 310 receives the load current measured by the current detector 305 and compares it to a threshold. In some embodiments, the threshold is set based on the threshold for a current protection circuit included in some embodiments of the communication device 100. For example, the threshold may be 2 milliamperes. The level detector 310 outputs a signal indicating whether the measured load current is greater than the threshold. In some embodiments, the level detector 310 output a different signals based on whether the measured load current is greater than the threshold. For example, the level detector 310 may output a first voltage signal when the measured load current is greater than the threshold, and a second voltage signal when the measured loaded current is less than the threshold. In alternate embodiments, the level detector 310 only outputs a signal when the measured load current is greater than the threshold. In other words, the level detector 310 does not output a signal when the measured load current is less than or equal to the threshold.

The power source selector 315 selectively connects the second power source 210 to the second power output terminal 220 based on the signal output by the level detector 310. The power source selector 315 connects the second power source 210 to the second power output terminal 220 when the level detector 310 detects that the measured load current is greater than the threshold. Further, the power source selector 315 disconnects the second power source 210 from the second power output terminal 220 when the level detector 310 detects that the measured load current is less than or equal to the threshold.

Figure 4:
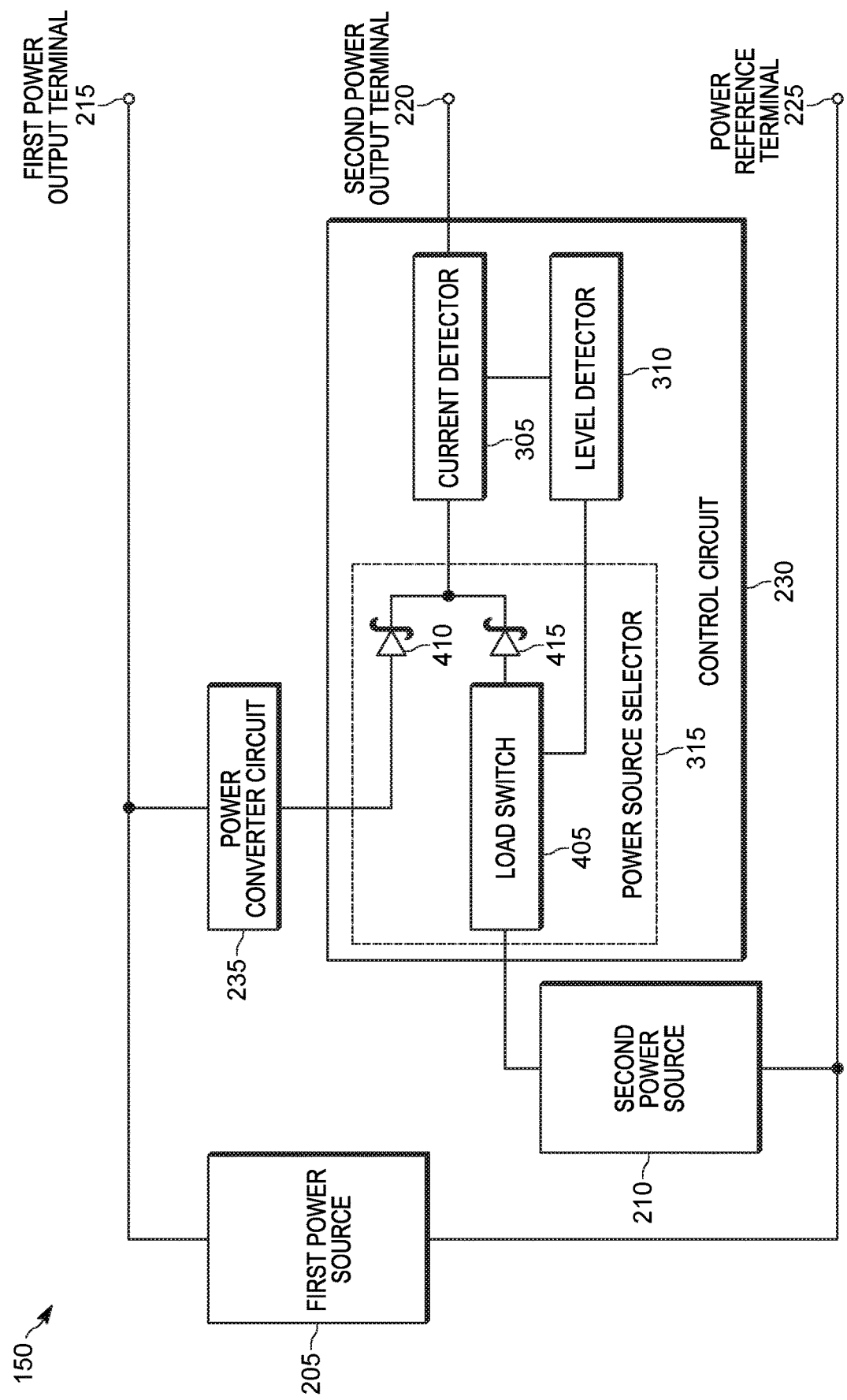
FIG. 4 is a diagram of a power source selector included in the control circuit of FIG. 3, in accordance with some embodiments.

FIG. 4 is a diagram of one example implementation of the power source selector 315. The power source selector 315 illustrated in FIG. 4 includes a load switch 405, a first Schottky diode 410, and a second Schottky diode 415. In some embodiments, the load switch 405 includes an electronic relay. The load switch 405 connects the second power source 210 to the second power output terminal 220 when the level detector 310 detects that the measured load current is greater than the threshold. Further, the load switch 405 disconnects the second power source 210 from the second power output terminal 220 when the level detector 310 detects that the measured load current is less than or equal to the threshold.

The first and second Schottky diodes 410 and 415 together act as power OR'ing circuit between the electrical current supplied by the first power source 205 and the electrical current supplied by the second power source 210. The low forward voltage and fast recovery time of a Schottky diode offers increased efficiency. In some embodiments, the first and second Schottky diodes 410 and 415 are replaced by an ideal diode OR device that uses field effect transistors to offer very low voltage drops.

The first and second Schottky diodes 410 and 415 are configured in the power source selector 315 such that the second power output terminal 220 does not simultaneously receive electrical current from both the first power source 205 and the second power source 210. When the first power source 205 supplies electrical current to the first Schottky diode 410 and the second power source 210 supplies electrical current to the second Schottky diode 415, the power OR'ing circuit (formed by the first and second Schottky diodes 410 and 415) only supplies electrical current to the second power output terminal 220 from the power source with the higher supply voltage. For example, the first power source 205 supplies 3.6 volts and the second power source 210 supplies 4.2 volts, only the second power source 210 supplies electrical current to the second power output terminal 220. In some embodiments, the power supply 150 lowers the voltage (for example, a first voltage) supplied by the first power source 205 to a lower voltage (for example, a second voltage) that is less than the voltage (for example, a third voltage) supplied by the second power source 210. For example, when the voltage supplied by the second power source 210 is 4.2 volts, the power converter circuit 235 may convert a 7.2 voltage supplied by the first power source 205 into a 3.6 voltage. In this manner, the power supply 150 prohibits the first power source 205 from supplying electrical current to the second power output terminal 220 when the second power source 210 is supplying electrical current to the second power output terminal 220. In other words, the power supply 150 prohibits the first power source 205 from supplying electrical current to the second power output terminal 220 when the measured load current is higher than the threshold.

Figure 5:
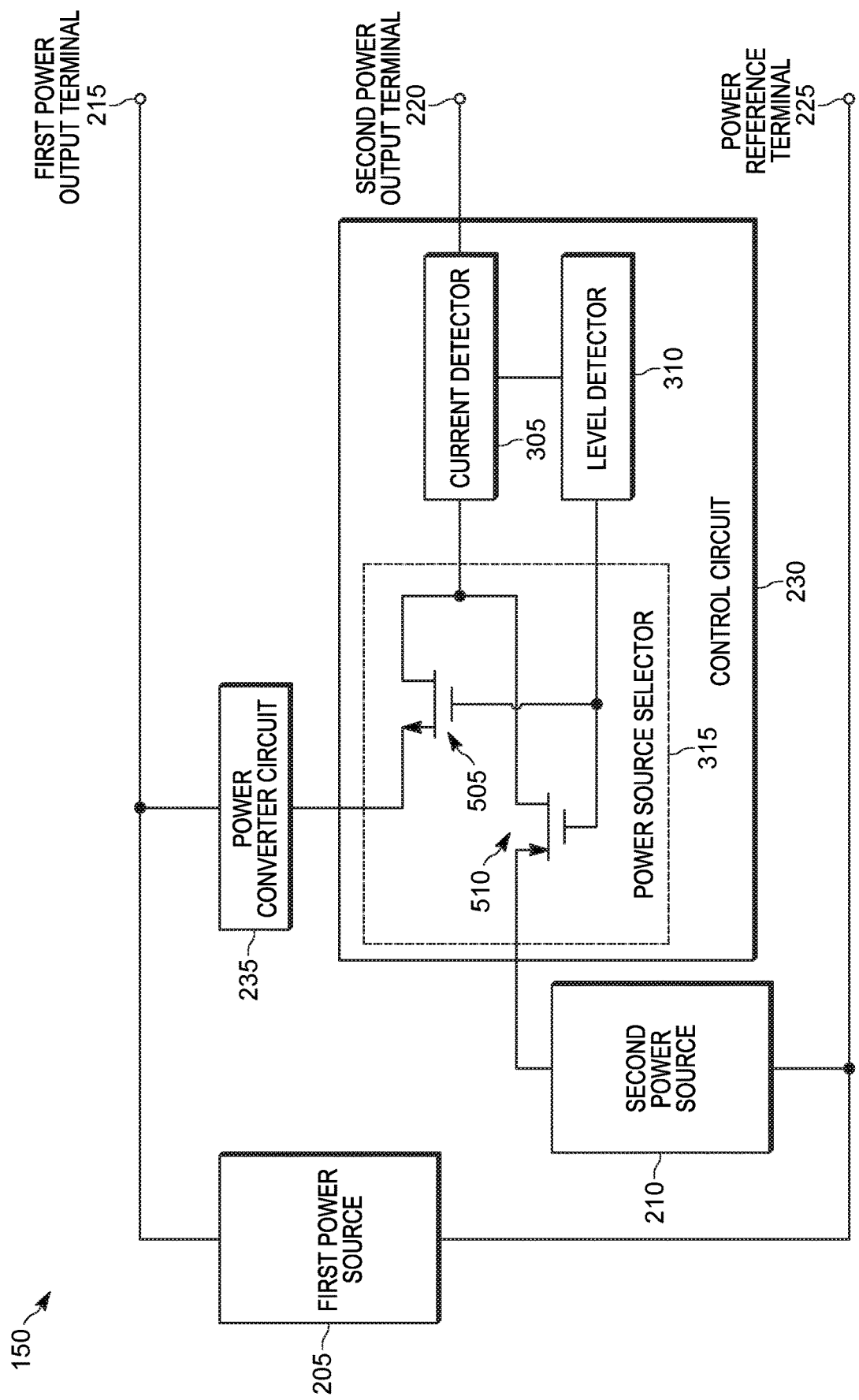
FIG. 5 is a diagram of a power source selector included in the control circuit of FIG. 3, in accordance with some embodiments.

FIG. 5 is a diagram of another example implementation of the power source selector 315. The power source selector 315 illustrated in FIG. 5 includes a negative-channel metal oxide semiconductor (NMOS) transistor 505 and a positive-channel metal oxide semiconductor (PMOS) transistor 510. The level detector 310 sends a signal to the NMOS and PMOS transistors 505 and 510 which causes the NMOS and PMOS transistors 505 and 510 to connect either the first power source 205 or the second power source 210 to the second power output terminal 220. When the measured load current is greater than the threshold, the level detector 310 sends a signal (for example, a logic high signal) which causes the NMOS transistor 505 to disconnect the first power source 205 from the second power output terminal 220 and causes the PMOS transistor 510 to connect the second power source 210 to the second power output terminal 220. Conversely, when the measured load current is less than the threshold, the level detector 310 sends a signal (for example, a logic low signal) which causes the NMOS transistor 505 to connect the first power source 205 to the second power output terminal 220 and causes the PMOS transistor 510 to disconnect the second power source 210 from the second power output terminal 220.

Figure 6:
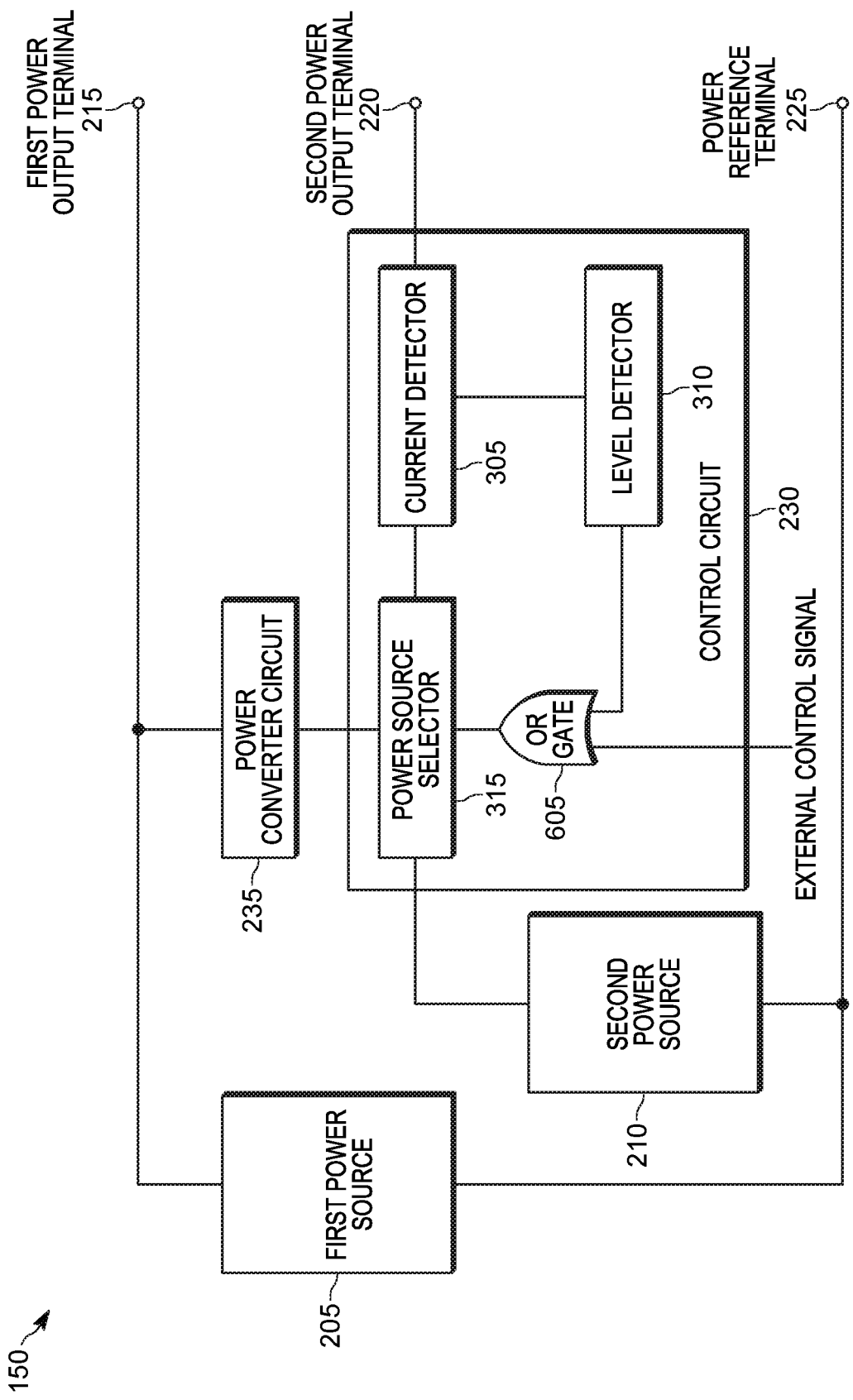
FIG. 6 is a diagram of a control circuit including an OR gate, in accordance with some embodiments.

In some embodiments, the control circuit 230 is configured to connect the second power source 210 to the second power output terminal 220 to provide electrical current thereto responsive to receiving an external control signal. For example, the control circuit 230 may connect the second power source 210 to the second power output terminal 220 responsive to receiving an external control signal sent by the electronic processor 105. In some embodiments, the external control signal indicates that peak current usage in the communication device 100 is expected. The external control signal can be maintained until it is determined that the peak current usage event is complete. FIG. 6 is an example diagram of the power supply 150 in which the control circuit 230 further includes an OR gate 605. The OR gate 605 receives a signal from the level detector 310. In addition, the OR gate 605 receives an external control signal, for example, from the electronic processor 105. The OR gate 605 sends a signal causing the power source selector 315 to connect the second power source 210 to the second power output terminal 220 when either the signal from the level detector 310 or the external control signal instructs the OR gate 605 to do so.

Figure 7:
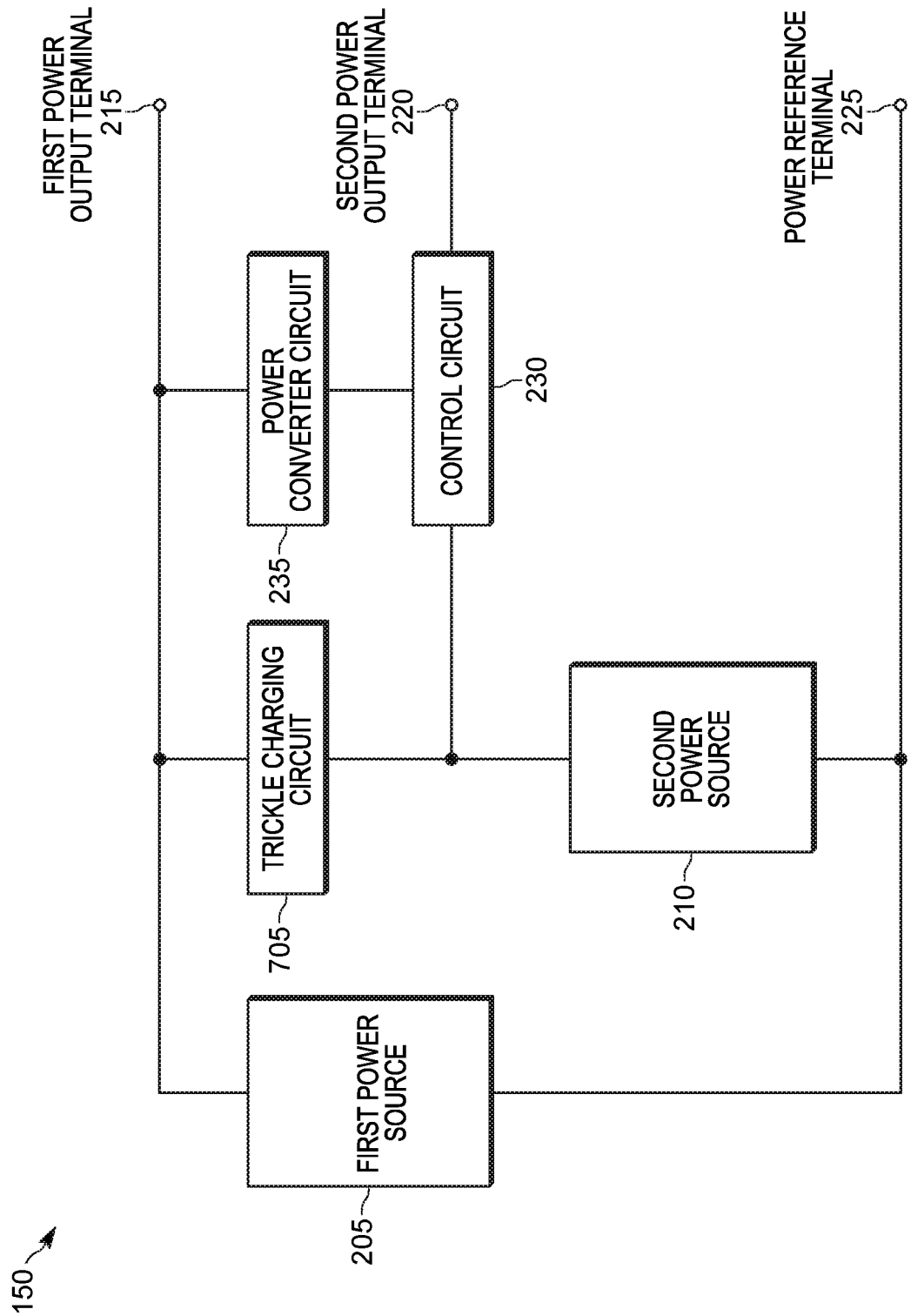
FIG. 7 is a diagram of a power supply including a trickle charging circuit, in accordance with some embodiments.

In some embodiments, the power supply 150 also includes a trickle charging circuit 705, as illustrated in FIG. 7. The trickle charging circuit 705 (for example, a low-rate charger) supplies a relatively small amount of electrical current (i.e., charger current) from the first power source 205 to the second power source 210 to keep the state of charge of the second power source 210 at (or near) top capacity when the second power source 210 is not in use. In some embodiments, the charger current of the trickle charging circuit 705 is determined based in part on the voltage capacity of the second power source 210, a predetermined number of high-current events, or both. In general, the total load current of the second power output terminal 220 over a given period of time should be less than or equal to the charger rate in order to keep the second power source 210 charged. As an example, when the communication device 100 experiences 2 ampere peaks lasting 3 seconds and occurring every 2 minutes, the communication device 100 uses an average of 50 milliampere-hours (mAhr) of capacity of the second power source 210 per hour. In this situation, the charge current of the trickle charging circuit 705 may be set to no less than 50 milliamperes. For example, the charge current of the trickle charging circuit 705 may be set to 100 milliamperes or 200 milliamperes.

Figure 8:
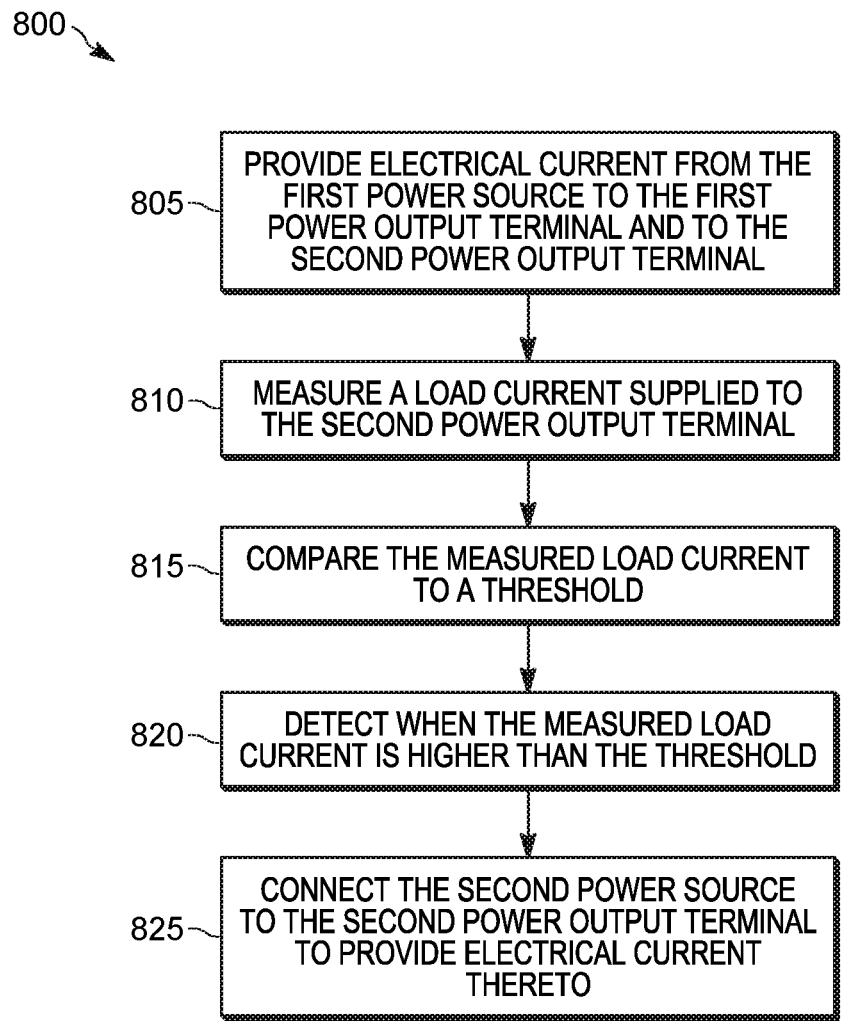
FIG. 8 is a flowchart of a method for supply power, in accordance with some embodiments.

FIG. 8 illustrates an example method 800 for operating the power supply 150 to supply power. The method 800 is described with respect to FIGS. 2 and 3. The method 800 is described as being performed by the power supply 150 and, in particular, the control circuit 230. However, it should be understood that in some embodiments, portions of the method 800 may be performed by other devices, including for example, another device included in the communication device 100.

At block 805, the first power source 205 provides electrical current to the first power output terminal 215 and to the second power output terminal 220. For example, the first power source 205 supplies a first rail voltage to the first power output terminal 215. The first power source 205 also supplies a second rail voltage to the second power output terminal 220 via the power converter circuit 235.

At block 810, the control circuit 230 measures a load current supplied to the second power output terminal 220. For example, the current detector 305 of the control circuit 230 measures the load current supplied to the second power output terminal 220 and outputs a signal to the level detector 310 indicating the measured load current.

At block 815, the control circuit 230 compares the measured load current to a threshold. For example, the level detector 310 receives the signal from the current detector 305 indicating the measured load current and compares the measured load current to a threshold.

At block 820, the control circuit 230 detects when the measured load current is higher than the threshold. For example, the level detector 310 detects when the measured load current is higher than the threshold based on the comparison of the measured load current to the threshold.

Responsive to detecting the measured load current being higher than the threshold, at block 825, the control circuit 230 connects the second power source 210 to the second power output terminal 220 to provide electrical current thereto. For example, responsive to the level detector 310 detecting the measured load current being higher than the threshold, the level detector 310 sends a signal to the power source selector 315 which causes that the power source selector 315 to connect the second power source 210 to the second power output terminal 220.

When the load current drops back down below the threshold, the control circuit 230 disconnects the second power source 210 from the second power output terminal 220. In some embodiments, the control circuit 230 disconnects the second power source 210 from the second power output terminal 220 immediately after detecting when the load current drops back down below the threshold. In alternate embodiments, the control circuit 230 connects the second power source 210 to the second power output terminal 220 to continuously provide electrical current thereto for at least predetermined period of time after detecting the measured load current being higher than the threshold. For example, the control circuit 230 connects the second power source 210 to the second power output terminal 220 to continuously provide electrical current thereto for 100 milliseconds after detecting the measured load current being higher than the threshold.

Embodiments of the disclosure can be advantageously implemented to address peak current issues in converged communication devices. For example, in converged communication devices in which a land mobile radio (LMR) platform is combined with an Android platform, peak currents due to both the land mobile radio platform (for example, during transmission) and the Android platform (for example, during boot-up) can add up and exceed the rated limits of the battery pack. This in turn may trip the battery safety circuits and the converged communication device will immediately be turned off. Embodiments of the disclosure address this issue by providing a secondary power source to better manage peak currents.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for supplying power, comprising
providing electrical current from a first power source to a first power output terminal and to a second power output terminal;
measuring, with a control circuit, a load current supplied to the second power output terminal;
comparing the measured load current to a threshold with the control circuit;
responsive to detecting the measured load current being higher than the threshold, connecting, with the control circuit, a second power source to the second power output terminal to provide electrical current thereto, wherein the second power source has a voltage level lower than the first power source;
disconnecting the second power source from the second power output terminal responsive to detecting the measured load current being below the threshold;
responsive to receiving an external control signal indicating an expected peak load current usage, connecting, with the control circuit, the second power source to the second power output terminal to provide electrical current thereto; and
prohibiting the first power source from supplying electrical current to the second power output terminal when the measured load current is higher than the threshold.

2. The method of claim 1, further comprising
connecting, with the control circuit, the second power source to the second power output terminal to continuously provide electrical current thereto for a predetermined period of time after detecting the measured load current being higher than the threshold.

3. The method of claim 1, further comprising
providing electrical current from the first power source to the second power source with a trickle charging circuit.

4. The method of claim 3, wherein a charger current of the trickle charging circuit is determined based in part on a charge capacity of the second power source.

5. The method of claim 1, wherein a voltage level of the first power source is at least twice the voltage level of the second power source.

6. The method of claim 1, further comprising
converting, with a power converter circuit, a first voltage supplied by the first power source to a second voltage, wherein the second voltage is less than a third voltage supplied by the second power source.

7. The method of claim 1, wherein the control circuit includes a power source selector configured to selectively connect the second power source to the second power output terminal to provide electrical current thereto, and wherein the power source selector includes a first Schottky diode and a second Schottky diode configured such that the second power output terminal does not simultaneously receive electrical current from both the first power source and the second power source.

8. A power supply comprising:
a first power source for providing electrical current to a first power output terminal and to a second power output terminal;
a second power source having a voltage level lower than the first power source; and
a control circuit configured to
measure a load current supplied to the second power output terminal,
compare the measured load current to a threshold,
responsive to detecting the measured load current being higher than the threshold, connect the second power source to the second power output terminal to provide electrical current thereto,
disconnect the second power source from the second power output terminal responsive to detecting the measured load current being below the threshold,
responsive to receiving an external control signal indicating an expected peak load current usage, connect the second power source to the second power output terminal to provide electrical current thereto, and
prohibit the first power source from supplying electrical current to the second power output terminal when the measured load current is higher than the threshold.

9. The power supply of claim 8, wherein the control circuit is further configured to connect the second power source to the second power output terminal to continuously provide electrical current thereto for at least predetermined period of time after detecting the measured load current being higher than the threshold.

10. The power supply of claim 8, further comprising a trickle charging circuit configured to provide electrical current from the first power source to the second power source.

11. The power supply of claim 10, wherein a charger current of the trickle charging circuit is determined based in part on a charge capacity of the second power source.

12. The power supply of claim 8, wherein a voltage level of the first power source is at least twice the voltage level of the second power source.

13. The power supply of claim 8, wherein the control circuit includes
a current detector configured to measure the load current supplied to the second power output terminal,
a level detector configured to compare the measured load current to the threshold, and
a power source selector configured to selectively connect the second power source to the second power output terminal to provide electrical current thereto.

14. The power supply of claim 8, further comprising
a power converter circuit configured to convert a first voltage supplied by the first power source to a second voltage, wherein the second voltage is less than a third voltage supplied by the second power source.

15. The power supply of claim 8, wherein the control circuit includes a power source selector configured to selectively connect the second power source to the second power output terminal to provide electrical current thereto, and wherein the power source selector includes a first Schottky diode and a second Schottky diode configured such that the second power output terminal does not simultaneously receive electrical current from both the first power source and the second power source.

* * * * *